(12) United States Patent
Hiraide

(10) Patent No.: US 11,701,780 B2
(45) Date of Patent: Jul. 18, 2023

(54) CONTROL METHOD FOR MOBILE ROBOT

(71) Applicant: Seiko Epson Corporation, Toyko (JP)

(72) Inventor: Toshinori Hiraide, Fujimi (JP)

(73) Assignee: SEIKO EPSON CORPORATION

( * ) Notice: Subject to any disclaimer, the term of this patent is extended or adjusted under 35 U.S.C. 154(b) by 232 days.

(21) Appl. No.: 17/155,259

(22) Filed: Jan. 22, 2021

(65) Prior Publication Data

US 2021/0229287 A1 Jul. 29, 2021

(30) Foreign Application Priority Data

Jan. 23, 2020 (JP) ................. 2020-008948

(51) Int. Cl.
*B25J 9/16* (2006.01)
*B25J 13/08* (2006.01)

(52) U.S. Cl.
CPC ............. *B25J 9/1692* (2013.01); *B25J 9/162* (2013.01); *B25J 13/088* (2013.01)

(58) Field of Classification Search
CPC ........ B25J 9/1692; B25J 9/162; B25J 13/088; B25J 5/007; B25J 9/1602; B25J 9/1651; B25J 9/1641; G05B 2219/39172; G05B 2219/40298
See application file for complete search history.

(56) References Cited

U.S. PATENT DOCUMENTS

| | | | | |
|---|---|---|---|---|
| 5,637,969 A * | 6/1997 | Kato | ...... | B25J 9/1641 318/560 |
| 10,399,222 B2 * | 9/2019 | Gomi | ...... | B25J 9/1651 |
| 10,948,917 B2 * | 3/2021 | Saito | ...... | G05D 1/0274 |
| 2008/0042608 A1 * | 2/2008 | Nelson | ...... | H01L 21/67253 318/568.21 |
| 2015/0120053 A1 * | 4/2015 | Motoyoshi | ...... | B25J 9/1641 901/46 |
| 2016/0176047 A1 * | 6/2016 | Gomi | ...... | B25J 9/1651 901/9 |
| 2018/0236666 A1 * | 8/2018 | Mozeika | ...... | B25J 13/006 |
| 2018/0257227 A1 * | 9/2018 | Washizu | ...... | B25J 9/1697 |
| 2019/0129425 A1 * | 5/2019 | Drexler | ...... | G01C 21/3848 |
| 2019/0148198 A1 * | 5/2019 | Hsieh | ...... | H01L 21/67733 700/218 |
| 2019/0224846 A1 * | 7/2019 | Pivac | ...... | B28D 1/003 |
| 2019/0255709 A1 * | 8/2019 | Inagaki | ...... | B25J 9/1641 |
| 2020/0108503 A1 * | 4/2020 | Yoshino | ...... | B25J 9/1628 |
| 2020/0306961 A1 * | 10/2020 | Hiraide | ...... | B25J 9/1628 |
| 2021/0031385 A1 * | 2/2021 | Rembisz | ...... | B25J 19/027 |

FOREIGN PATENT DOCUMENTS

| | | | | |
|---|---|---|---|---|
| EP | 1468775 A1 * | 10/2004 | ............. | B23K 26/04 |
| JP | 2000-071183 A | 3/2000 | | |
| JP | 2018-149660 A | 9/2018 | | |

* cited by examiner

*Primary Examiner* — Adam R Mott
*Assistant Examiner* — Sagar KC
(74) *Attorney, Agent, or Firm* — Harness, Dickey & Pierce, P.L.C.

(57) ABSTRACT

A control method includes (a) measuring a misregistration index value relating to misregistration of a distal end portion of a manipulator by controlling the manipulator to perform a test operation, and (b) setting a limit value for an operation of the manipulator to prevent the misregistration index value from exceeding a predetermined threshold value.

2 Claims, 5 Drawing Sheets

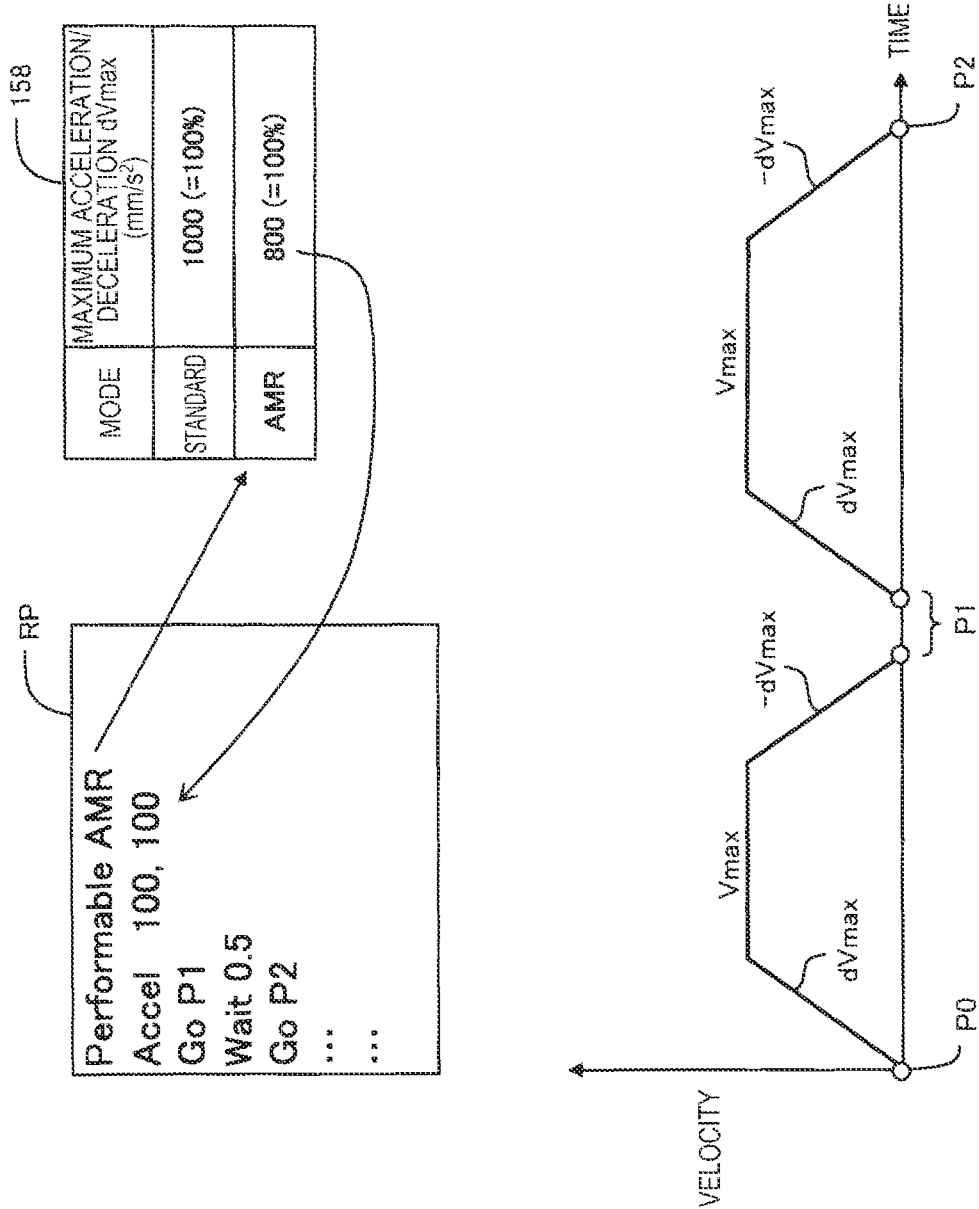

CONTROL METHOD FOR MOBILE ROBOT

The present application is based on, and claims priority from JP Application Serial Number 2020-008948, filed Jan. 23, 2020, the disclosure of which is hereby incorporated by reference herein in its entirety.

BACKGROUND

1. Technical Field

The present disclosure relates to a mobile robot including a manipulator mounted on a movable platform.

2. Related Art

JP-A-2000-71183 discloses, regarding a mobile robot including an arm unit mounted on a movable platform, a misregistration prevention mechanism of preventing misregistration of the movable platform due to high-speed motion of the robot arm. In the following description, the arm unit or the robot transported by the movable platform is also referred to as "manipulator". When misregistration of the movable platform occurs due to motion of the manipulator, misregistration also occurs in the distal end portion of the manipulator in response and that may cause a failure of work by the mobile robot.

However, in the above described related art, it is necessary to actuate the misregistration prevention mechanism when the mobile robot performs work, and there are problems of extended takt time and efficiency degradation. Accordingly, a technique that may reduce excessive misregistration occurring in the distal end portion of the manipulator using different means from the misregistration prevention mechanism is desired.

SUMMARY

According to a first aspect of the present disclosure, a control method for a mobile robot having a movable platform and a manipulator mounted on the movable platform is provided. The control method includes (a) measuring a misregistration index value relating to misregistration of a distal end portion of the manipulator by controlling the manipulator to perform a test operation, and (b) setting a limit value for an operation of the manipulator to prevent the misregistration index value from exceeding a predetermined threshold value.

BRIEF DESCRIPTION OF THE DRAWINGS

FIG. 6 is an explanatory diagram showing examples of a control program and an operation of the manipulator.

DESCRIPTION OF EXEMPLARY EMBODIMENTS

Figure 1:
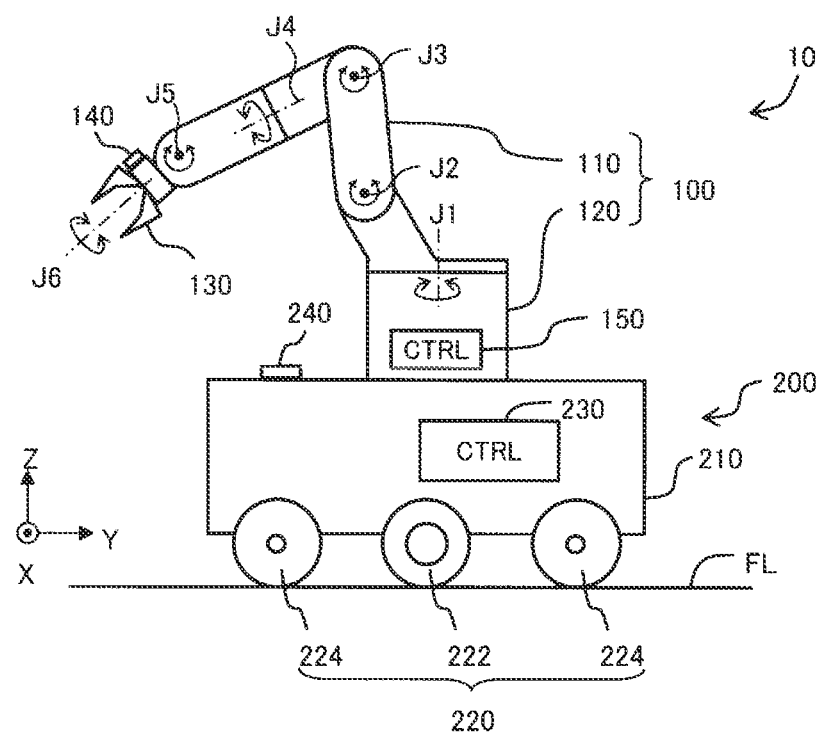
FIG. 1 is a conceptual diagram of a robot system.

FIG. 1 is a conceptual diagram of a robot system 10 of an embodiment of the present disclosure. The robot system 10 is a mobile robot including a manipulator 100 and a movable platform 200. In FIG. 1, three coordinate axes X, Y, Z of a robot coordinate system are shown. The origin of the robot coordinate system may be provided in any location of the robot system 10. In FIG. 1, the origin is shown outside of the robot system 10 for convenience of illustration.

The manipulator 100 includes an arm 110 and a base 120. An end effector 130 such as a hand and a vibration sensor 140 are attached to a distal end portion of the arm 110. The vibration sensor 140 is a sensor for measuring vibration in the distal end portion of the arm 110. The base 120 is fixed to the movable platform 200. In the base 120, a control apparatus 150 that controls the manipulator 100 is provided. In this example, the manipulator 100 is a six-axis robot having six axes J1 to J6. Note that, as the manipulator 100, one having at least one axis is usable. In the embodiment, a vertical articulated robot is assumed as the manipulator 100, however, the manipulator is not limited to that. For example, the manipulator may be a horizontal articulated robot. Or, the movable platform 200 may have a plurality of the manipulators 100.

The movable platform 200 has a main body 210 and wheels 220 provided in the lower part of the main body 210. The wheels 220 include two drive wheels 222 and four driven wheels 224 and a half of the wheels are shown in FIG. 1. In the main body 210, a control apparatus 230 that controls the movable platform 200 is provided. Further, an inertial sensor 240 for measuring an acceleration or an angular velocity of the movable platform 200 is attached to a part of the main body 210. As the inertial sensor 240, e.g. a gyro sensor that detects an angular velocity or an IMU (Inertial Measurement Unit) that detects an acceleration and an angular velocity is available. The inertial sensor 240 may be placed in another location than the movable platform 200. For example, the inertial sensor 240 may be placed in the base 120 of the manipulator 100. The movable platform 200 is a mobile guided vehicle that autonomously travels on a floor surface FL and also called an AMR (Autonomous Mobile Robot). As a drive system for the movable platform 200, in place of a powered wheels steering system using the two drive wheels 222, an omnidirectional wheels steering system called Mecanum may be used. Or, as the movable platform 200, another apparatus such as a linear slider may be used.

The control apparatus 230 of the movable platform 200 and the control apparatus 150 of the manipulator 100 execute control of the robot system 10 while communicating with each other. That is, it may be considered that the two control apparatuses 150, 230 form a control apparatus that executes overall control of the robot system 10. In another embodiment, a single control apparatus that executes overall control of the robot system 10 may be used. The term "control apparatus for robot" includes both of the configurations.

Figure 2:
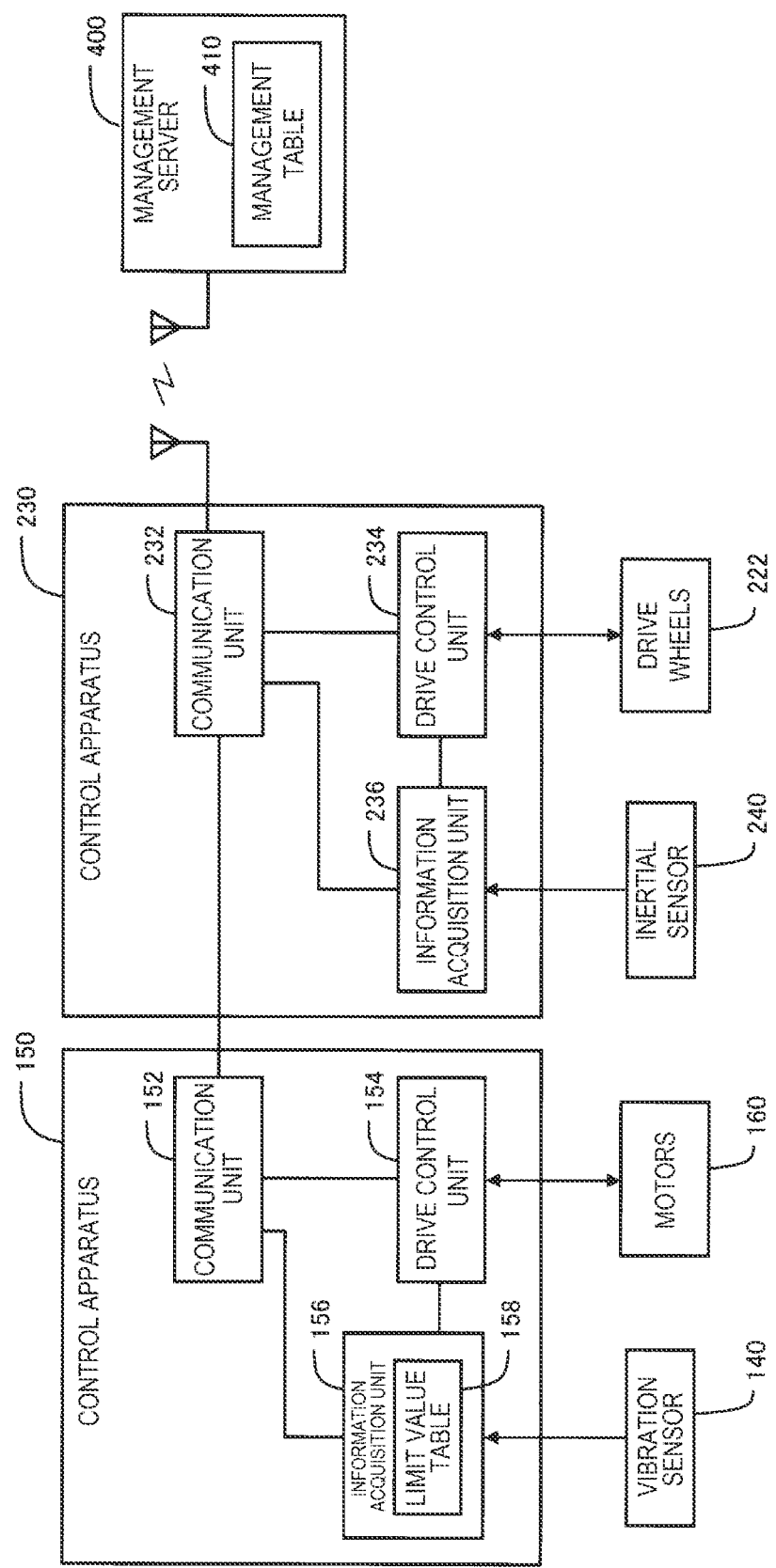
FIG. 2 is an explanatory diagram showing functions of control apparatuses of the robot system.

FIG. 2 is an explanatory diagram showing functions of the control apparatuses 150, 230 of the robot system 10. As described above, the functions of the respective units of the control apparatuses 150, 230 shown in FIG. 2 may be implemented in a single control apparatus.

As shown in FIG. 2, the whole system configuration of the embodiment includes a management server 400 that transmits and receives various kinds of information to and from the control apparatus 230 via wireless communication. The management server 400 has a management table 410 for management of work information on works of the robot system 10. The work information includes information representing target positions to be reached by the robot system 10 for works.

The control apparatus 150 of the manipulator 100 has a communication unit 152, a drive control unit 154, and an information acquisition unit 156. The communication unit 152 transmits and receives various kinds of information by communicating with the control apparatus 230 of the movable platform 200. The drive control unit 154 executes drive control of motors 160 provided for the respective axes of the manipulator 100. The information acquisition unit 156 acquires and stores information necessary for drive control by the drive control unit 154. The information necessary for drive control is e.g. the maximum acceleration/deceleration as a limit value of the operation of the manipulator 100. The maximum acceleration/deceleration of the manipulator 100 is stored in a limit value table 158.

The control apparatus 230 of the movable platform 200 has a communication unit 232, a drive control unit 234, and an information acquisition unit 236. The communication unit 232 transmits and receives various kinds of information by communicating with the control apparatus 150 of the manipulator 100 and the management server 400. The drive control unit 234 executes drive control of the drive wheels 222 of the movable platform 200. The information acquisition unit 236 acquires and stores information necessary for drive control by the drive control unit 234.

The measurement value of the vibration sensor 140 is acquired by the information acquisition unit 156 of the control apparatus 150. The measurement value of the inertial sensor 240 is acquired by the information acquisition unit 236 of the control apparatus 230 and acquired by the information acquisition unit 156 of the control apparatus 150 via the communication units 232, 152. Note that the inertial sensor 240 may be directly coupled to the control apparatus 150 and the information acquisition unit 156 of the control apparatus 150 may directly acquire the measurement value of the inertial sensor 240. In the following description, in either case, the control apparatus 150 acquires the measurement values of the sensors 140, 240.

Figure 3:
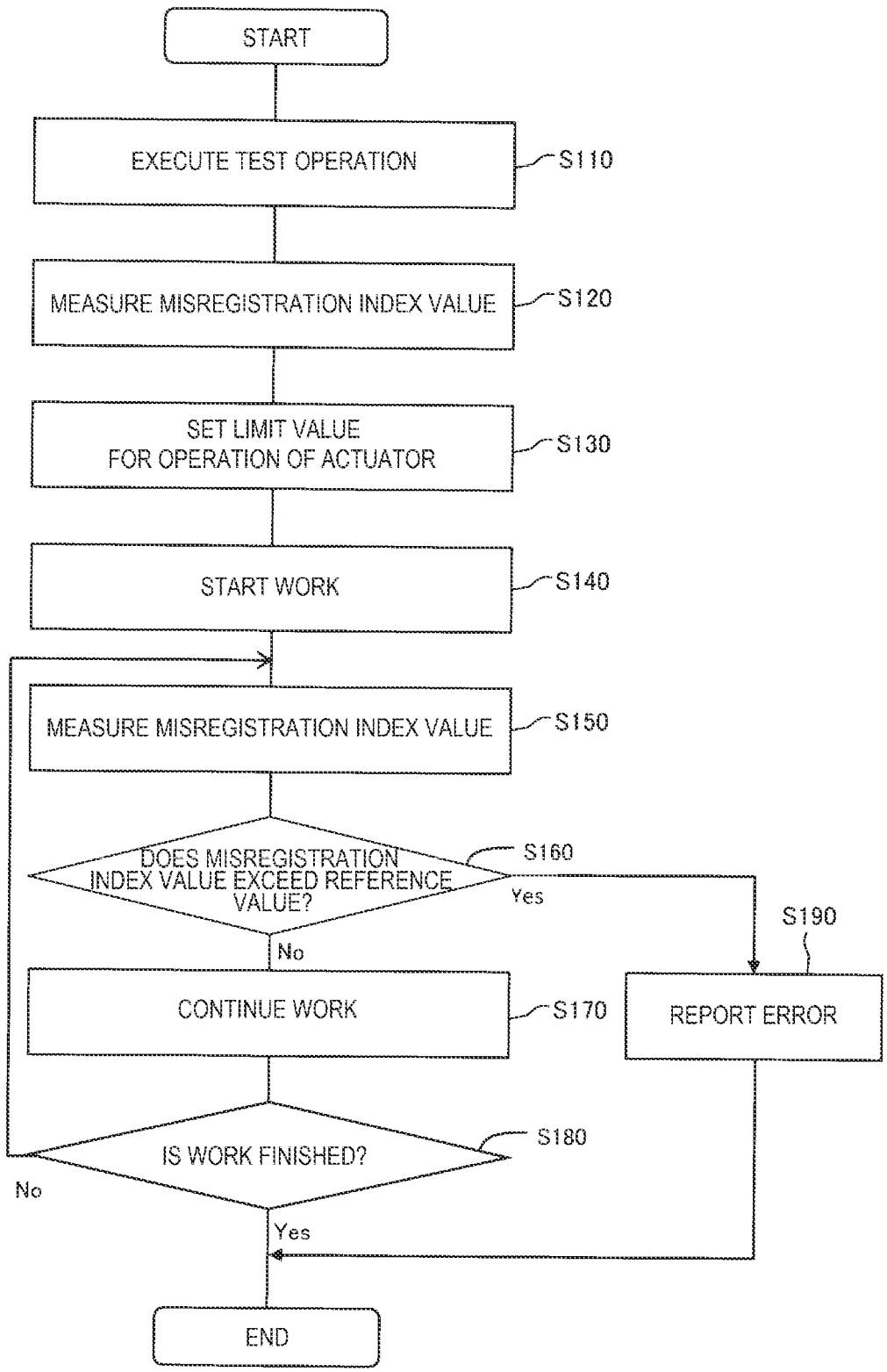
FIG. 3 is a flowchart of a work by the robot system.

FIG. 3 is a flowchart of a work by the robot system 10. Steps S110 to S130 are preparation steps executed before the actual work is started by the robot system 10. The actual work is executed at step S140 and the subsequent steps.

At step S110, the control apparatus 150 of the manipulator 100 executes a test operation and, at step S120, the control apparatus 150 measures a misregistration index value at the test operation using the sensors 140, 240. "Misregistration index value" refers to an index value relating to misregistration of the distal end portion of the manipulator 100, i.e., an index value correlated with the misregistration of the distal end portion of the manipulator 100. For example, when the vibration sensor 140 is used, the measurement value representing the vibration of the distal end portion of the manipulator 100 is the misregistration index value. On the other hand, when the inertial sensor 240 is used, the measurement value representing the angular velocity or the acceleration of the movable platform 200 is the misregistration index value. These measurement values are the misregistration index values because the vibration of the distal end portion of the manipulator 100 and the angular velocity or the acceleration of the movable platform 200 largely affect the position of the distal end portion of the manipulator 100. As test operations, operations of moving a TCP (Tool Center Point) of the manipulator 100 at various accelerations/decelerations by driving a specific axis of the manipulator 100 are usable. As the specific axis, one or more of the plurality of axes J1 to J6 of the manipulator 100 can be arbitrarily selected. For example, when the axis J1 closest to the base 120 and the next closest axes J2, J3 are driven at a larger acceleration, larger misregistration easily occurs in the distal end portion of the manipulator 100. Therefore, it is preferable to respectively select one or more of the three axes J1 to J3 closest to the base 120 as "specific axis" and execute the test operation. In the following description, the acceleration/deceleration of the TCP of the manipulator 100 will be simply referred to as "acceleration/deceleration of manipulator 100". "Acceleration/deceleration" includes both an acceleration and a deceleration. The TCP of the manipulator 100 can be set in an arbitrary position near the distal end portion of the manipulator 100.

Figure 4:
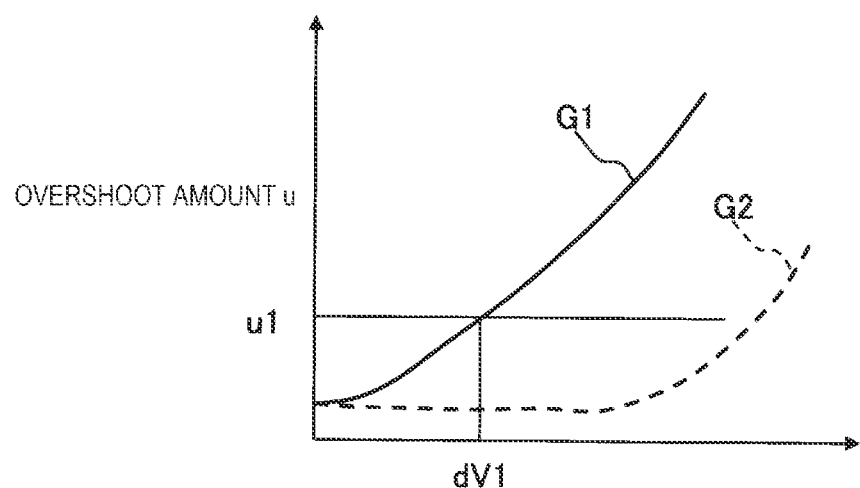
FIG. 4 is a graph showing overshoot amounts obtained in test operations.

FIG. 4 is a graph showing overshoot amounts obtained in test operations as examples of the misregistration index values. The horizontal axis indicates an absolute value of acceleration/deceleration dV of the manipulator 100, and the vertical axis indicates an overshoot amount u of the vibration of the distal end portion of the manipulator 100. The overshoot amount u refers to the maximum overshoot amount of the vibration measured by the vibration sensor 140 attached to the distal end portion of the manipulator 100, i.e., a difference between the maximum value of the amplitude of the vibration and a convergence value of the vibration.

A graph G1 in FIG. 4 shows characteristics obtained by a configuration in which the manipulator 100 is placed on the movable platform 200, i.e., the configuration of the embodiment. On the other hand, a graph G2 shows a case where the manipulator 100 is placed on a floor surface or a steady pedestal, not the movable platform 200. It may be understood that, when the manipulator 100 is placed on the movable platform 200 as in the embodiment, the overshoot amount u of the vibration of the distal end portion of the manipulator 100 with an acceleration or a deceleration of the TCP position becomes larger and more largely affects the misregistration of the distal end portion of the manipulator 100.

The test operation is e.g. an operation of gradually increasing the absolute value of the acceleration/deceleration dV of the manipulator 100 until the overshoot amount u reaches a predetermined threshold value u1. As the axis driven for changing the acceleration/deceleration dV, for example, the axis J1 pivoting around a center axis parallel to the vertical direction or the axis J2 or J3 pivoting about a center axis parallel to the horizontal direction is selected.

In the example of FIG. 4, when the acceleration/deceleration dV of the manipulator 100 reaches a value dV1, the overshoot amount u reaches the predetermined threshold value u1. The value dV1 is referred to as "acceptable value dV1". In this case, it is preferable to set the limit value of the acceleration/deceleration dV of the manipulator 100 to a value equal to the acceptable value dV1 or a value slightly smaller than the acceptable value dV1. In this manner, the overshoot amount u does not exceed the threshold value u1 during the operation of the manipulator 100, and thus, a potential that excessive misregistration occurs in the distal end portion of the manipulator 100 may be reduced.

Figure 5:
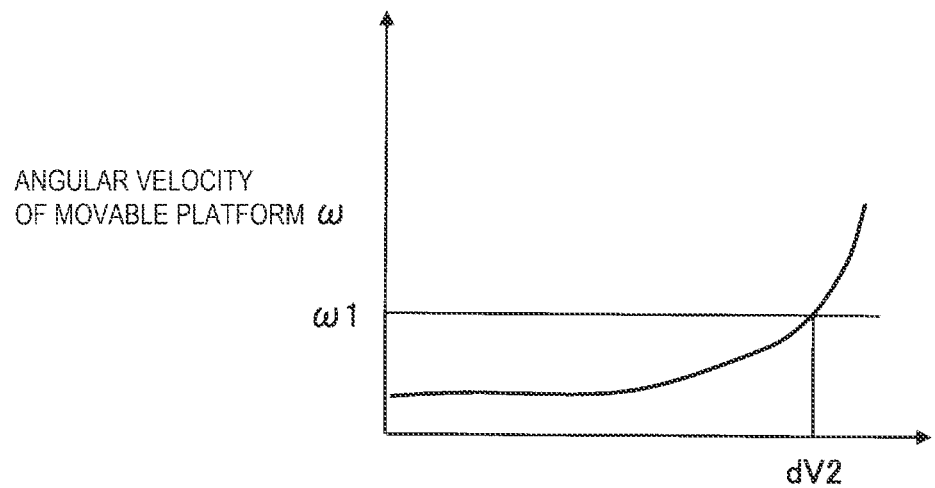
FIG. 5 is a graph showing an angular velocity of a movable platform obtained in a test operation.

FIG. 5 is a graph showing an angular velocity ω of the movable platform 200 obtained in a test operation as another example of the misregistration index value. The test operation is an operation of gradually increasing the absolute value of the acceleration/deceleration dV of the manipulator 100 until the angular velocity ω of the movable platform 200 reaches a predetermined threshold value ω1. When the inertial sensor 240 provided in the movable platform 200 is used, as the axis for changing the acceleration/deceleration dV, for example, the axis J1 pivoting about the center axis parallel to the vertical direction is selected. In this case, the angular velocity ω of the movable platform 200 is an angular velocity around the vertical direction Z in FIG. 1. Or, as the axis for changing the acceleration/deceleration dV, the axis J2 or J3 pivoting about the center axis parallel to the horizontal direction may be selected. In this case, the angular velocity ω of the movable platform 200 is an angular velocity around the horizontal direction X or Y in FIG. 1. In either case, the angular velocities in the three axial directions may be measured by the inertial sensor 240 and used as the misregistration index values. As the misregistration index value, in place of the angular velocity ω, the acceleration of the movable platform 200 measured by the inertial sensor 240 can be used.

In the example of FIG. 5, when the acceleration/deceleration dV of the manipulator 100 reaches a value dV2, the angular velocity co of the movable platform 200 reaches the threshold value w1. The value dV2 is referred to as "acceptable value dV2". In this case, it is preferable to set the limit value of the acceleration/deceleration dV of the manipulator 100 to a value equal to the acceptable value dV2 or a value slightly smaller than the acceptable value dV2. In this manner, the angular velocity co of the movable platform 200 does not exceed the threshold value w1 during the operation of the manipulator 100, and thus, a potential that excessive misregistration occurs in the distal end portion of the manipulator 100 may be reduced.

Note that the limit value of the acceleration/deceleration of the manipulator 100 may be set using at least one of the acceptable value dV1 of the acceleration/deceleration obtained in the measurement using the vibration sensor 140 in FIG. 4 and the acceptable value dV2 of the acceleration/deceleration obtained in the measurement using the inertial sensor 240 in FIG. 5. When only one of the two acceptable values dV1, dV2 is used, one of the vibration sensor 140 and the inertial sensor 240 can be omitted. When the limit value of the acceleration/deceleration of the manipulator 100 is set to a value equal to or smaller than the minimum value of these two acceptable values dV1, dV2, the misregistration index values u, w obtained by the two types of sensors 140, 240 do not exceed the threshold values u1, ω1, respectively, and thereby, the potential that excessive misregistration occurs in the distal end portion of the manipulator 100 may be further reduced.

In the above described FIGS. 4 and 5, the limit value of the acceleration/deceleration of the manipulator 100 is determined by the test operations of driving only part of the axes, however, the limit value of the acceleration/deceleration of the manipulator 100 may be determined by test operations of driving all axes J1 to J6. Note that, when the same acceleration/deceleration is applied to the manipulator 100, the acceleration/deceleration around the single axis is larger in the case of driving only part of the axes, and it is assumed that the influence on the misregistration of the distal end portion is larger. Therefore, the limit value of the acceleration/deceleration determined by the test operations of driving only part of the axes is applied to various operations of the manipulator 100, and thereby, the misregistration of the distal end portion of the manipulator 100 may be reliably reduced.

The limit value of the acceleration/deceleration of the manipulator 100 is determined in the above described manner, and then, at step S130 in FIG. 3, the control apparatus 150 sets the limit value in the limit value table 158. At step S140, the work by the robot system 10 is started.

At step S150, the control apparatus 150 measures the respective misregistration index values using the sensors 140, 240 during the actual work by the robot. Specifically, the vibration sensor 140 measures the overshoot amount u and the inertial sensor 240 measures the angular velocity or the acceleration of the movable platform 200. As described above, in the embodiment, the measurements of the misregistration index values are performed even during the work by the robot system 10.

At step S160, the control apparatus 150 determines whether or not the measured misregistration index values exceed predetermined reference values, that is, whether or not the misregistration index values are excessive. As the reference values, the same values as the threshold values u1, w1 described in FIGS. 4 and 5 may be used or different values may be used. When the measured misregistration index values exceed the predetermined reference values, the process moves to step S190 and the control apparatus 150 reports an error to an operator and ends the processing. The reporting of the error is a kind of issuing of a warning and performed using a reporting unit such as a display unit or a speaker (not shown) of the control apparatus 150. When the measured misregistration index values do not exceed the predetermined reference values, the process moves to step S170 and the work is continued. At step S180, the control apparatus 150 determines whether or not the work is finished and, when the work is not finished, the process returns to step S150 and the above described steps S150 to S180 are repeated.

FIG. 6 is an explanatory diagram showing examples of a control program RP and an operation of the manipulator 100. Here, in addition to the control program RP of the manipulator 100, the limit value table 158 in which the limit values of the operation of the manipulator 100 are stored and a graph showing accelerating/decelerating operation of the manipulator 100 are shown.

In the limit value table 158, values of the maximum acceleration/deceleration dVmax as the limit values of the operation of the manipulator 100 are registered for two modes of a standard mode and an AMR mode. The standard mode is e.g. an operation mode when the manipulator 100 is placed on a floor surface or a steady pedestal. On the other hand, the AMR mode is an operation mode when the manipulator 100 is placed on the movable platform 200. In the example of FIG. 6, only one value of the maximum acceleration/deceleration dVmax is set in each operation mode, however, the maximum acceleration and the maximum deceleration may be separately set. As will be understood from the examples, the term "maximum acceleration/deceleration" includes both the maximum acceleration and the maximum deceleration.

The first line of the control program RP in FIG. 6 describes the name "AMR" of the operation mode of the manipulator 100. The second line describes that absolute values of the acceleration and the deceleration in the operation of the manipulator 100 are set to 100% of the maximum acceleration/deceleration dVmax. The third line describes that the TCP of the manipulator 100 is moved to a next target position P1. The fourth line describes waiting for 0.5 seconds after reaching the target position P1. The fifth line describes that the TCP of the manipulator 100 is moved to a next target position P2 after waiting.

In the lower part of FIG. 6, the graph showing changes in acceleration/deceleration when the TCP of the manipulator 100 is sequentially moved from an initial position P0 to the target positions P1, P2. The horizontal axis of the graph indicates time and the vertical axis indicates a velocity of the TCP. The second line of the control program RP describes that the respective absolute values of the acceleration and the deceleration of the manipulator 100 are set to 100% of the maximum acceleration/deceleration dVmax, and thus, the absolute values of the acceleration and the deceleration of the manipulator 100 are set to values equal to the maximum acceleration/deceleration dVmax. For acceleration, the TCP of the manipulator 100 is accelerated to a velocity upper limit value Vmax according to the maximum acceleration dVmax and, before stopping in the target position, decelerated according to the maximum deceleration −dVmax.

Note that, in the examples of FIGS. 4 to 6, the maximum acceleration/deceleration dVmax is set as the limit value for the operation of the manipulator 100, however, in place of the maximum acceleration/deceleration dVmax or in addition to the maximum acceleration/deceleration dVmax, another operation value such as the velocity upper limit value Vmax may be set as the limit value for the operation of the manipulator 100.

In the above described embodiment, the limit value is set for the operation of the manipulator 100 so that the misregistration index value may not exceed the predetermined threshold value, and thereby, the potential that excessive misregistration occurs in the distal end portion of the manipulator 100 may be reduced.

OTHER EMBODIMENTS

The present disclosure is not limited to the above described embodiment, but may be realized in various aspects without departing from the scope thereof. For example, the present disclosure can be realized in the following aspects. The technical features in the embodiment corresponding to the technical features in the respective aspects described as below can be appropriately replaced or combined for solving part or all of the problems of the present disclosure or achieving part or all of the effects of the present disclosure. Further, the technical features may be appropriately deleted without description as essential features in the specification.

(1) According to a first aspect of the present disclosure, a control method for a mobile robot having a movable platform and a manipulator mounted on the movable platform is provided. The control method includes (a) measuring a misregistration index value relating to misregistration of a distal end portion of the manipulator by controlling the manipulator to perform a test operation; and (b) setting a limit value for an operation of the manipulator to prevent the misregistration index value from exceeding a predetermined threshold value.

According to the control method, the limit value is set for the operation of the manipulator to prevent the misregistration index value from exceeding the predetermined threshold value, and thereby, a potential that excessive misregistration occurs in the distal end portion of the manipulator may be reduced.

(2) In the above described control method, the misregistration index value may be a value indicating misregistration of the movable platform.

According to the control method, a potential that excessive misregistration occurs in the movable platform due to the operation of the manipulator may be reduced and, as a result, also, the potential that excessive misregistration occurs in the distal end portion of the manipulator may be reduced.

(3) In the above described control method, the value indicating misregistration of the movable platform may be an acceleration or an angular velocity measured by an inertial sensor attached to the movable platform.

According to the control method, the manipulator may be controlled to prevent the acceleration or the angular velocity of the movable platform from being excessive.

(4) In the above described control method, the misregistration index value may be a value indicating vibration of the distal end portion of the manipulator.

According to the control method, a potential that excessive vibration occurs in the distal end portion due to the operation of the manipulator may be reduced and, as a result, also, the potential that excessive misregistration occurs in the distal end portion of the manipulator may be reduced.

(5) In the above described control method, the value indicating vibration of the distal end portion of the manipulator may be an overshoot amount of vibration measured by a vibration sensor attached to the distal end portion.

According to the control method, the manipulator may be controlled to prevent the overshoot amount of the vibration of the distal end portion from being excessive.

(6) In the above described control method, the limit value may include the maximum acceleration/deceleration of the manipulator.

According to the control method, a potential that misregistration of the distal end portion is excessive may be reduced by limitation of the acceleration/deceleration of the manipulator.

(7) The above described control method further includes (c) controlling the mobile robot to execute a work under the limit value, and (c) includes measuring the misregistration index value in the work and issuing a warning when the misregistration index value in the work exceeds a predetermined reference value.

According to the control method, the warning is issued when the misregistration index value is larger during the work by the mobile robot, and thereby, a potential that the misregistration of the distal end portion of the manipulator may be prevented from being larger.

What is claimed is:

1. A control method for a mobile articulated robot having a movable platform and a manipulator mounted on the movable platform, comprising:
repeatedly moving and stopping, with a plurality of moving speeds, at least a first arm of a plurality arms of the manipulator having a plurality of rotational axes while maintaining a location of the movable platform at the same location, the first arm rotating around a first axis parallel to a vertical direction, the first arm being one of three proximal arms with respect to the moveable platform;
repeatedly measuring an overshoot amount of vibration by vibration sensor attached at a distal end portion of the plurality of arms while the first arm repeatedly moves;
calculating a first acceptable value by comparing the measured overshot amounts with a first threshold value;
repeatedly measuring an angular velocity with respect to the first axis by an inertial sensor attached to the moveable platform while the first arm repeatedly moves;
calculating a second acceptable value by comparing the measured angular velocities with a second threshold value;
determining an operation value with respect to acceleration and deceleration operations of the manipulator, the operation value being equal to or lower than a smaller one of the first and second acceptable values; and operating the mobile articulated robot according to a condition in which the operation value includes a maximum value of the acceleration and deceleration operations of the manipulator.

2. The control method according to claim 1, further comprising:

issuing a warning when the mobile articulated robot is operated according to a condition in which the operation value exceeds a predetermined reference value.

* * * * *